US010385987B2

(12) United States Patent
Winkler et al.

(10) Patent No.: US 10,385,987 B2
(45) Date of Patent: Aug. 20, 2019

(54) ELECTROMAGNETICALLY ACTUATABLE GAS VALVE, AND METHOD FOR INCREASING THE SEAL OF AN ELECTROMAGNETICALLY ACTUATABLE GAS VALVE

(71) Applicant: Robert Bosch GmbH, Stuttgart (DE)

(72) Inventors: Bernd Winkler, St. Florian (AT); Andreas Ploeckinger, Gunskirchen (AT); Johannes Gerstmayr, Hellmonsödt (AT); Manfred Nader, Engerwitzdorf (AT); Christian Zehetner, Linz (AT)

(73) Assignee: Robert Bosch GmbH, Stuttgart (DE)

( * ) Notice: Subject to any disclaimer, the term of this patent is extended or adjusted under 35 U.S.C. 154(b) by 102 days.

(21) Appl. No.: 15/128,171

(22) PCT Filed: Jan. 29, 2015

(86) PCT No.: PCT/EP2015/051823
§ 371 (c)(1),
(2) Date: Sep. 22, 2016

(87) PCT Pub. No.: WO2015/144341
PCT Pub. Date: Oct. 1, 2015

(65) Prior Publication Data
US 2017/0089301 A1     Mar. 30, 2017

(30) Foreign Application Priority Data
Mar. 25, 2014   (DE) .................. 10 2014 205 496

(51) Int. Cl.
*F16K 31/06*     (2006.01)
*F02M 21/02*     (2006.01)
*F16K 25/00*     (2006.01)

(52) U.S. Cl.
CPC ...... *F16K 31/0655* (2013.01); *F02M 21/0233* (2013.01); *F02M 21/0245* (2013.01);
(Continued)

(58) Field of Classification Search
CPC ............. F16K 31/0655; F16K 25/005; Y10T 137/7839; Y10T 137/87507; Y10T 137/87314; F02M 21/026
See application file for complete search history.

(56) References Cited

U.S. PATENT DOCUMENTS 601,059 A  *  3/1898  Laval .................. F16K 17/168
                                                    137/522
5,398,724 A     3/1995  Vars et al.
(Continued)

FOREIGN PATENT DOCUMENTS

EP     2383457     11/2011
GB     2334552     8/1999

OTHER PUBLICATIONS

International Search Report for Application No. PCT/EP2015/051823 dated Jun. 3, 2015 (English Translation, 2 pages).

*Primary Examiner* — Atif H Chaudry
(74) *Attorney, Agent, or Firm* — Michael Best & Friedrich LLP

(57) ABSTRACT

The invention relates to an electromagnetically actuatable gas valve for metering a gaseous fuel into a suction tract of a motor, in particular a gas or diesel gas motor, comprising a valve seat (1) which is designed as a flat seat and which has multiple annular webs (3) that are arranged in a concentric manner and are connected via at least one radially running web (4) in order to delimit circular or semicircular through-flow openings (2). The electromagnetically actuatable gas valve further comprises a movable valve plate (5) which sealingly interacts with the valve seat (1) and which has multiple annular sealing webs (6) that are arranged in a
(Continued)

concentric manner and can be brought into an overlapping arrangement with the circular or semicircular through-flow openings (2) of the valve seat (1). According to the invention, the rigidity of the valve seat (1) and/or the valve plate (5) is substantially constant in the radial direction, the rigidity of the valve seat (1) being greater than the rigidity of the valve plate (5). The invention further relates to a method for increasing the seal of an electromagnetically actuatable gas valve.

20 Claims, 4 Drawing Sheets

(52) U.S. Cl.
CPC .... *F02M 21/0254* (2013.01); *F02M 21/0257* (2013.01); *F02M 21/0263* (2013.01); *F02M 21/0272* (2013.01); *F16K 25/005* (2013.01); *F16K 31/0658* (2013.01); *Y02T 10/32* (2013.01); *Y10T 137/7839* (2015.04); *Y10T 137/87314* (2015.04); *Y10T 137/87507* (2015.04)

(56) References Cited

U.S. PATENT DOCUMENTS

| 6,112,765 | A | 9/2000 | Boyer | |
| 6,182,943 | B1* | 2/2001 | Steinruck | F16K 31/0655 239/585.3 |
| 2011/0266474 | A1* | 11/2011 | Ranegger | F16K 31/02 251/129.01 |

* cited by examiner

ELECTROMAGNETICALLY ACTUATABLE GAS VALVE, AND METHOD FOR INCREASING THE SEAL OF AN ELECTROMAGNETICALLY ACTUATABLE GAS VALVE

BACKGROUND OF THE INVENTION

The invention relates to an electromagnetically actuatable gas valve for metering a gaseous fuel into a suction tract of an engine, in particular a gas or diesel/gas engine. The invention furthermore relates to a method for increasing the seal of an electromagnetically actuatable gas valve.

Electromagnetically actuatable gas valves for injecting gaseous fuels into a suction tract of an engine are widely known. The use of such valves can involve combining them to form a central injection unit for supplying a plurality of cylinders of the engine with gaseous fuel (central gas injection—"CGI") or providing at least one separate gas valve for each cylinder (multi-point injection—"MPI").

A gas valve of the type in question is disclosed by German Laid-Open Application DE 199 05 721 A1, for example. In order to provide a large passage cross section combined with short switching and response times, there is a proposal in this document for a gas valve, which is designed as a flat seat valve. It has a level valve seat and a sealing element having at least one level sealing surface facing the valve seat. This design is intended to allow valve cross sections of up to several 100 mm$^2$, which it should be possible to reliably switch while simultaneously achieving short switching times. In this case, the valve seat is preferably formed by at least two concentric sealing strips, which define an annular passage cross section, which can be covered by a—preferably annular—sealing element. A plurality of annular passage cross sections of the valve seat can preferably be covered by a plurality of circumferential webs of the sealing element, of which at least two in each case are connected to one another by at least one radial web. The resulting grid structure of the sealing element is intended to ensure sufficient mechanical strength. In order, furthermore, to counteract deformations due to forces of the opening and closing system acting on the sealing element, provision is furthermore made for the opening and closing forces to be transmitted to the sealing element via a plunger. The plunger is intended to bring about large-area introduction of the force and thereby prevent deformation moments, thus ensuring the sealing effect.

SUMMARY OF THE INVENTION

Starting from the abovementioned prior art, it is the underlying object of the present invention to provide a gas valve with an optimum sealing effect or to improve the seal of a gas valve. The gas valve should be suitable for metering a gaseous fuel into a suction tract of an engine, in particular a gas or diesel/gas engine. Here, "diesel" is taken to include diesel-like fuels, e.g. heavy oil, marine diesel and/or kerosene.

The electromagnetically actuatable gas valve proposed for the purpose of metering a gaseous fuel into a suction tract of an engine, in particular a gas or diesel/gas engine, comprises a valve seat, which is designed as a flat seat and which, to delimit circular or partially circular through-flow openings, has a plurality of concentrically arranged annular webs. The plurality of concentrically arranged annular webs is connected by at least one radially extending web. The gas valve further comprises a movable valve disk, which interacts sealingly with the valve seat and which has a plurality of concentrically arranged annular sealing webs, which can be brought into overlap with the circular or partially circular through-flow openings of the valve seat in order to close the through-flow openings. To increase the seal of the gas valve in the closed position, the proposal according to the invention is that the stiffness of the valve seat and/or the valve disk is substantially constant in the radial direction, wherein the stiffness of the valve seat is greater than the stiffness of the valve disk.

The proposed constant stiffness of the valve seat and/or of the valve disk in the radial direction counteracts deformations, which could impair the sealing effect of the gas valve. Here, "in the radial direction" means that each web and/or each sealing web has substantially the same stiffness, thus avoiding jumps in stiffness from sealing seat to sealing seat. This is because each annular web of the valve seat forms a respective sealing seat for an annular sealing web of the valve disk.

The concentric arrangement of the webs or sealing webs, which are connected by one or more radially extending webs, entails that a web or sealing web situated radially on the outside is less stiff—owing to its arc length—than a web or sealing web situated radially on the inside and is therefore more prone to deformations. However, it is important to counteract such deformations to ensure the seal and hence the operation of the gas valve.

Such deformations of individual webs and/or sealing webs are counteracted if, according to the invention, there are no jumps in stiffness between the sealing seats. In this way, the seal in the region of the sealing seats is enhanced, thereby resulting in an increase in the functional reliability of the gas valve. The sealing effect in the region of the sealing seats of the valve seat is further improved if, according to the invention, the stiffness of the valve seat is furthermore greater than that of the valve disk. Moreover, this measure contributes to a reduction in the moved mass.

In order to achieve a substantially constant stiffness of the valve seat and/or of the valve disk in the radial direction, the proposal according to a preferred embodiment of the invention is that the cross-sectional area of a web situated radially on the outside is greater than that of a web situated radially on the inside, and/or the cross-sectional area of a sealing web situated radially on the outside is greater than that of a sealing web situated radially on the inside. Since the valve seat is designed as a flat seat, the enlargement of the cross-sectional area of a web or sealing web can take place only in a direction away from the flat seat, e.g. by increasing the height h, which corresponds to the axial extent of a web or sealing web. With the enlargement of the cross-sectional area, the stiffness of a web forming a sealing seat or of a sealing web interacting with the sealing seat also increases. Here, the enlargement of the cross-sectional area should be such that jumps in stiffness between the sealing seats are prevented.

In dimensioning the cross-sectional area of the webs or sealing webs, an analytic approximation equation for a beam clamped at both ends and subject to a distributed load (Bernoulli-Euler beam) is preferably taken as a basis:

$$y_m = \frac{ql^4}{384EI}$$

Here, "q" is the distributed load, "l" is the free length, "E" is the elasticity modulus and "I" is the second moment of area. From this, it is possible to determine the maximum deflection $y_{mmax}$.

For a given maximum deflection $y_{mmax}$, a given pressure load p and a given beam width b, the distributed load can be calculated from the following equation:

$$q=pb$$

The required beam height $h_{erf}$ can then be obtained from the following equation:

$$h_{erf} = \sqrt[3]{\frac{pl^4}{32Ey_{mmax}}}$$

It is advantageous if at least one web of the valve seat and/or one sealing seat of the valve disk has/have a rectangular cross section. A rectangular cross section can be produced more easily and in this way simplifies the manufacture of the valve seat or of the valve disk. Moreover, it is easily possible to achieve an enlargement of the cross-sectional area by changing the height h.

As a development of the invention, it is proposed that at least one web of the valve seat and/or one sealing web of the valve disk has a substantially L-, T- or U-shaped cross section. By means of a substantially L- or U-shaped cross section, it is possible, in particular, to increase the torsional stiffness of a web or of a sealing web.

A first leg of a substantially L-, T- or U-shaped cross section preferably forms a seat surface or sealing surface, while at least one second leg, which preferably encloses a right angle with the first leg, brings about a reinforcement of the first leg. In order to change the stiffness of a web and/or sealing web, all that is then required is to change the height h of the second leg used for reinforcement, while the dimensions of the first leg can remain unchanged.

According to a preferred embodiment of the invention, the second leg of a web or sealing web of L-shaped cross section is arranged radially on the outside with respect to the radial extent of the first leg, on the side facing away from the seat surface or the sealing surface. By means of this measure, the center of shear is shifted from the center of the cross section in the direction of the central axis of the valve seat or valve disk, thereby making it possible to compensate for unwanted outward twisting of the web or sealing web.

It is advantageous if the webs of the valve seat are connected by a plurality of radially extending webs. Since the radially extending webs simultaneously provide support, it is possible in this way to increase the stiffness of the individual annular webs. In order at the same time to achieve stiffness which is as constant as possible in the circumferential direction, the plurality of radially extending webs is preferably arranged at equal angular intervals.

It is furthermore proposed that the sealing webs of the valve disk are likewise connected by at least one radially extending web. A plurality of radially extending webs is preferably provided, and these are furthermore preferably arranged at equal angular intervals, for the reasons already mentioned above.

To achieve the object stated at the outset, a method for increasing the seal of an electromagnetically actuatable gas valve is furthermore provided. The gas valve is one which comprises a valve seat, which is designed as a flat seat and which, to delimit circular or partially circular through-flow openings, has a plurality of concentrically arranged annular webs, which are connected by at least one radially extending web. The gas valve further comprises a movable valve disk, which interacts sealingly with the valve seat and which has a plurality of concentrically arranged annular sealing webs, which can be brought into overlap with the circular or partially circular through-flow openings of the valve seat. According to the invention, it is envisaged that the stiffness of the valve seat and/or the valve disk is chosen to be substantially constant in the radial direction, wherein the stiffness of the valve seat is chosen to be greater than the stiffness of the valve disk. By means of these two measures, the seal of the gas valve can be significantly enhanced. This is because, on the one hand, jumps in stiffness between the individual sealing seats, which in the present case are formed by the annular webs of the valve seat, are prevented. On the other hand, the stiffness of the valve disk can be matched in an optimum way to the stiffness of the valve seat. A certain flexibility of the valve disk is preferably maintained in order to ensure sealing contact of the valve disk on the valve seat.

According to a preferred embodiment of the method according to the invention, the cross-sectional area of a web of the valve seat situated radially on the outside is chosen to be greater than that of a web situated radially on the inside. As an alternative or in addition, the cross-sectional area of a sealing web of the valve disk situated radially on the outside is chosen to be greater than that of a sealing web situated radially on the inside. The differences in size of the cross-sectional areas of the webs and/or sealing webs in accordance with the respective radial position thereof enables the stiffness of a web or sealing web to be matched to the respective circumstances, ensuring that there are no jumps in stiffness between the sealing seats.

In accordance with the gas valve according to the invention described above, a web or sealing web can be of rectangular or substantially L-, T- or U-shaped design in cross section. The substantially L- or U-shaped design counteracts, in particular, torsion of a web of the valve seat or of a sealing web of the valve disk.

The method proposed leads, in particular, to the above-described gas valve according to the invention, and therefore reference can be made as regards further preferred design features to the statements made above.

BRIEF DESCRIPTION OF THE DRAWINGS

The invention is explained in greater detail below with reference to the attached drawings (FIGS. 1 to 7), which relate to preferred embodiments of the invention. In the drawings.

DETAILED DESCRIPTION

Figure 1:
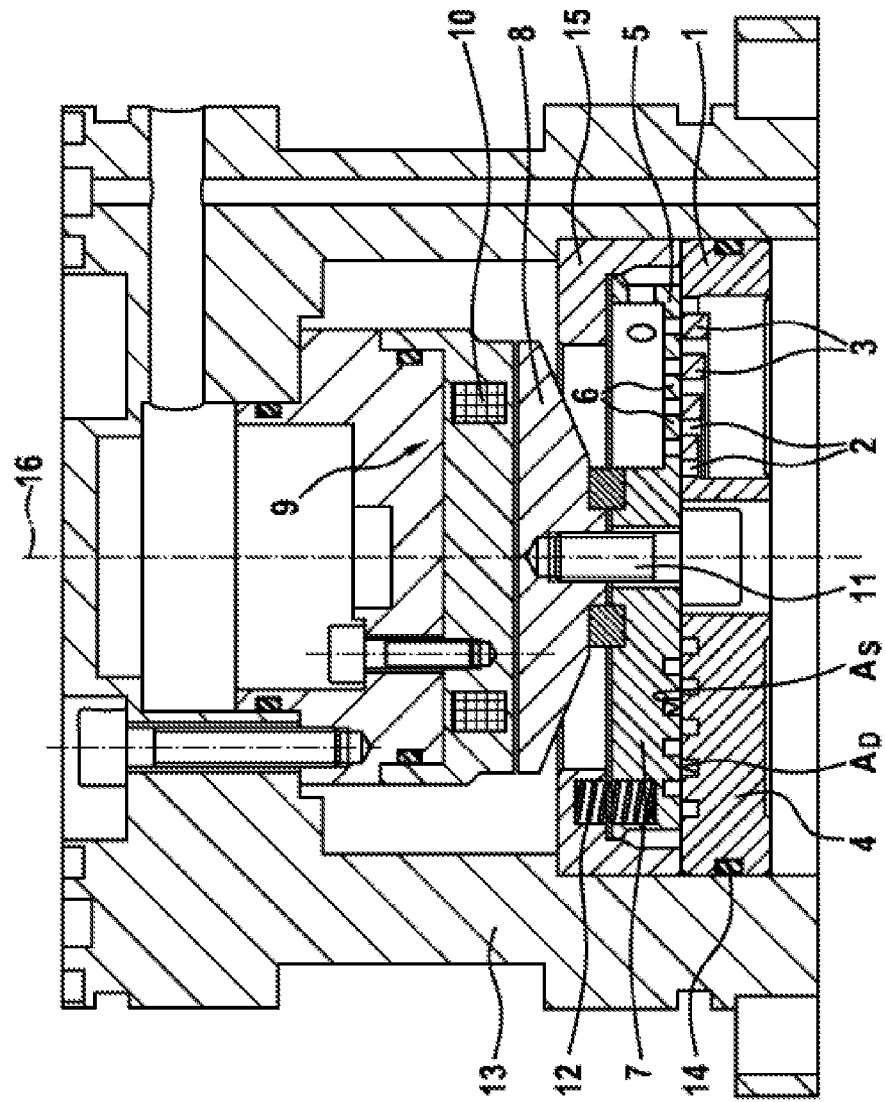
FIG. 1 shows a longitudinal section through a gas valve according to the invention according to a first preferred embodiment.

The gas valve illustrated in longitudinal section in FIG. 1 has a valve housing 13, in which a plate-shaped body is inserted to form a valve seat 1. The valve seat 1 is formed by a plurality of concentrically arranged annular webs 3, which are connected by radially extending webs 4 in such a way that partially circular through-flow openings 2 are formed between the webs 3 and 4. In this way, each web 3 forms a sealing seat with a seat surface $A_S$, which interacts sealingly with a sealing surface $A_D$ of an annular sealing web 6 of a valve disk 5 accommodated movably in the valve housing 13 when the gas valve closes and the plurality of concentrically arranged annular sealing webs 6 of the valve disk 5 are each brought into overlap with a partially circular through-flow opening 2 of the valve seat 1.

A magnet subassembly 9 having a magnet coil 10 for actuating the gas valve is furthermore accommodated in the valve housing 13. Here, the magnet subassembly 9 interacts with an armature 8 capable of a stroke motion, which is operatively connected to the valve disk 5 by an armature pin 11. If the magnet coil 10 of the magnet subassembly 9 is energized, a magnetic field builds up, bringing about a stroke motion of the armature 8 in the direction of the magnet coil 10. Owing to the connection via the armature pin 11, the armature 8 takes the valve disk 5 along at the same time, counter to the spring force of a closing spring 12. The gas valve opens. The maximum stroke of the armature 8 or of the valve disk 5 is predetermined by a stop plate 15 accommodated in the valve housing 13.

If the energization of the magnet coil 10 is ended, the spring force of the closing spring 12 returns the valve disk 5 to its initial position. Owing to the connection via the armature pin 11, the armature 8 is taken along this time and, in this way, is likewise returned to its initial position. The spring force of the closing spring 12 presses the valve disk 5 against the valve seat 1, with the result that the sealing surfaces $A_D$ of the sealing webs 6 of the valve disk 5 rest sealingly on the seat surfaces $A_S$ of the webs 3 of the valve seat 1, and the sealing webs 6 of the valve disk 5 close the through-flow openings 2 of the valve seat 1.

In order to increase the seal in the region of the valve seat 1, the valve disk 5 is less stiff than the valve seat 1. Furthermore, the webs 3 of the valve seat 1 have different cross-sectional areas in order to prevent jumps in stiffness between the individual sealing seats of the valve seat 1.

Figure 2:
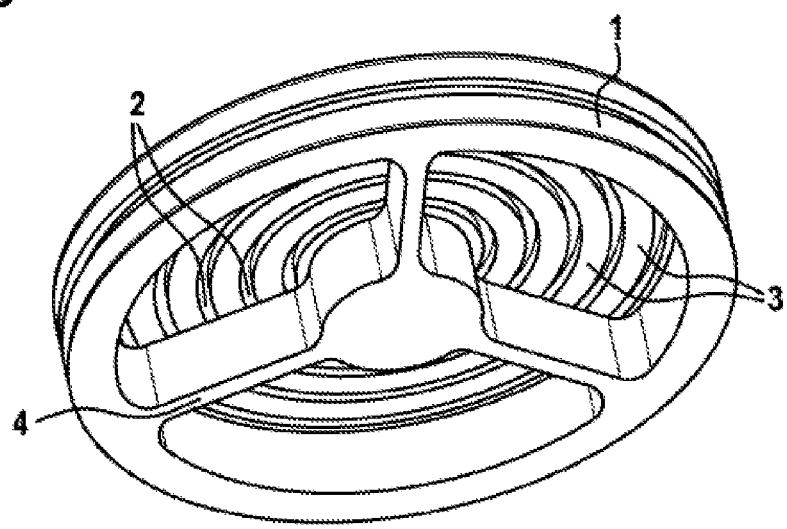
FIG. 2 shows a perspective illustration of a valve seat of a known gas valve.

As can be seen from FIG. 1, the cross-sectional area of the webs 3 of the valve seat 1 increases with the radial distance thereof from a central axis 16 of the gas valve. To this extent, the valve seat 1 of the gas valve in FIG. 1 differs from a conventional valve seat 1 of the kind illustrated by way of example in FIG. 2. This is because the webs 3 in a conventional valve seat 1 each have the same cross-sectional area. Since, with the distance of a web 3 from the central axis 16, the arc length thereof also increases, wherein the arc length corresponds to the length of a web 3 between two radially extending webs 4, the stiffness of a web 3 increases accordingly. The valve seat 1 of a conventional gas valve thus has jumps in stiffness between the individual sealing seats, with the result that, in particular, the webs 3 situated radially on the outside tend to deform, as illustrated by way of example in FIG. 4. In this case, sealing contact between the sealing surfaces $A_D$ and the seat surfaces $A_S$ is not assured. This applies, in particular, because the sealing webs 6 of a conventional valve disk 5 of the kind illustrated by way of example in FIG. 3 also tend to undergo such deformations.

Figure 3:
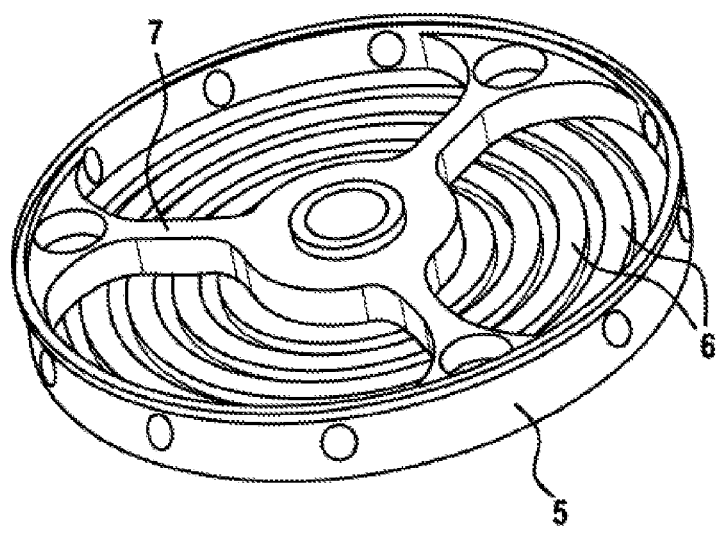
FIG. 3 shows a perspective illustration of a valve disk of a known gas valve.
Figure 4:
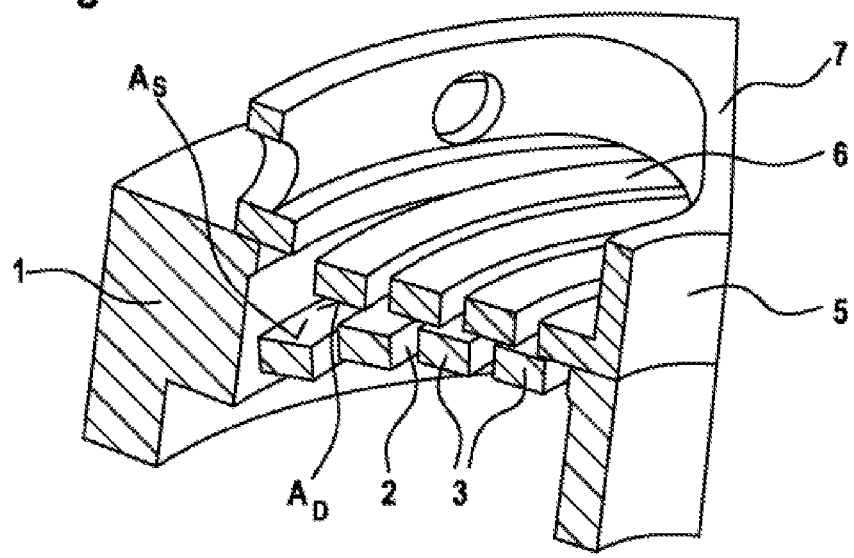
FIG. 4 shows a perspective sectioned view through the valve seat and the valve disk of a known gas valve.

As can be seen from FIG. 3, the sealing webs 6 of the valve disk 5 can also be connected to one another by radially extending webs 7. In the present case, the valve disk 5 shown has three radially extending webs, which are arranged at equal angular intervals. The same applies to the known valve seat 1 shown in FIG. 2. By means of the radially extending webs 4, 7, the stiffness of a web 3 or of a sealing web 6 can be increased since the arc length of the webs 3 or sealing webs 6 can be shortened by increasing the number of webs 4, 7.

The stiffness of a web 3 of the valve seat 1 and/or of a sealing web 6 of the valve disk 5 can accordingly depend on various factors. These factors can be taken into account, in particular, by adapting the cross-sectional area of a web 3 and/or of a sealing web 6 in an appropriate manner.

In the illustrative embodiment in FIG. 1, the webs 3 have an increased cross-sectional area with increasing distance from the central axis 16. The enlargement of the cross-sectional area is brought about by an increase in the overall height of the webs 3 with the respective radial distance thereof from the central axis 16. Here, the height is dimensioned in such a way that the webs 3 have a substantially constant stiffness in the radial direction and jumps in stiffness from sealing seat to sealing seat are avoided.

Figure 5:
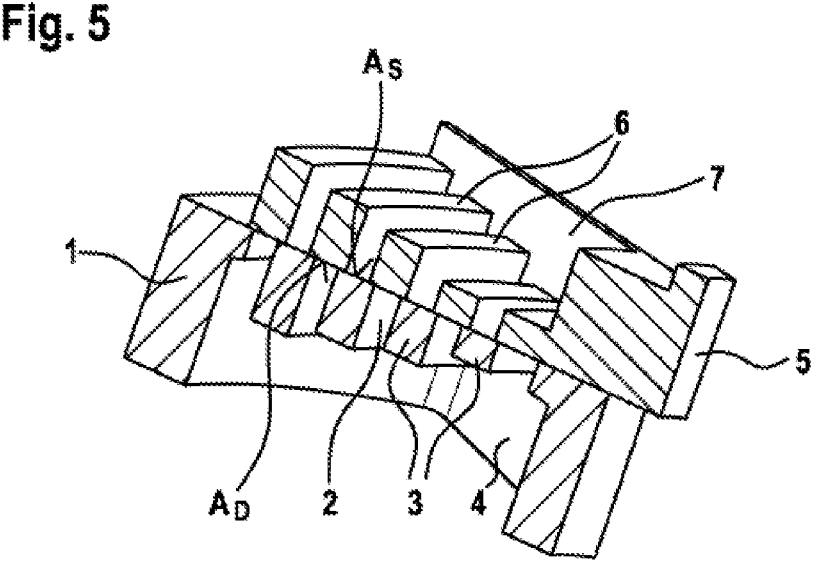
FIG. 5 shows a perspective sectioned view through the valve seat and the valve disk of a gas valve according to the invention according to a second preferred embodiment.

In order to counteract deformation of the sealing webs 6 of the valve disk 5, they can be designed to correspond to the webs 3 of the valve seat 1. This embodiment is shown by way of example in FIG. 5.

Figure 6:
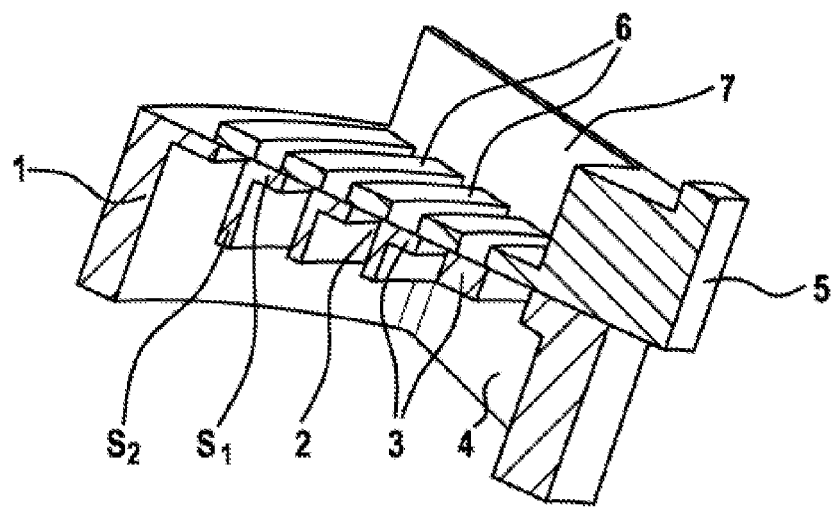
FIG. 6 shows a perspective sectioned view through the valve seat and the valve disk of a gas valve according to the invention according to a third preferred embodiment.
Figure 7:
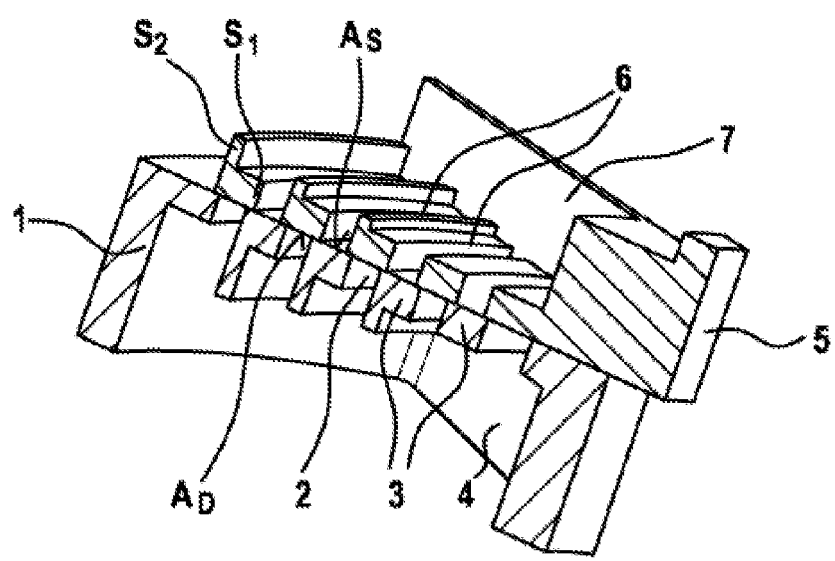
FIG. 7 shows a perspective sectioned view through the valve seat and the valve disk of a gas valve according to the invention according to a fourth preferred embodiment.

Instead of a rectangular cross section, all the webs or individual webs 3 and/or sealing webs 6 can also have an L-shaped cross section, as shown by way of example in FIGS. 6 and 7. An L-shaped cross section increases torsional stiffness. The L-shaped cross section comprises a first leg $S_1$ and a second leg $S_2$, which together enclose a right angle. The second leg $S_2$ is offset radially outward and is in each case arranged on that side of the first leg $S_1$ which faces away from the seat surface $A_S$ or the sealing surface $A_D$. In order to change the cross-sectional area of a web 3 or of a sealing web 6, all that is required is to change the height of the second leg $S_2$ in an appropriate manner.

The invention is not restricted to the embodiments illustrated. On the contrary, modifications which, in particular, relate to the number and configuration of the webs 3 and/or of the sealing webs 6 and of the radially extending webs 4 and 7 are conceivable. Moreover, different cross sections of the webs 3 and/or of the sealing webs 6 can be combined. The aim of a substantially constant stiffness of the valve seat 1 and/or of the valve disk 5 in the radial direction can be achieved in different ways.

Moreover, it is possible to take further measures to increase the seal of a gas valve according to the invention. For example, a sealing element 14 can be placed between the valve seat 1 and the valve housing 13 to prevent leakage between the valve seat 1 and the valve housing 13 (see FIG. 1).

The invention claimed is:

1. An electromagnetically actuatable gas valve for metering a gaseous fuel into a suction tract of an engine, the gas valve comprising a valve seat (1), which is designed as a flat seat and which, to delimit circular or partially circular through-flow openings (2), has a plurality of concentrically arranged annular webs (3), which are connected by at least one radially extending web (4), further comprising a movable valve disk (5), which interacts sealingly with the valve seat (1) and which has a plurality of concentrically arranged annular sealing webs (6), which can be brought into overlap with the circular or partially circular through-flow openings (2) of the valve seat (1), wherein a stiffness of at least one of the valve seat (1) and the valve disk (5) is substantially constant in a radial direction, wherein the stiffness of the valve seat (1) is greater than the stiffness of the valve disk (5), wherein at least one of a web (3) of the valve seat (1) having through-flow openings (2) on both radial sides thereof and a web (6) of the valve disk (5) having openings on both radial sides thereof has a substantially L-shaped cross section, and wherein a first leg ($S_1$) of the substantially L-shaped cross section forms a seat surface ($A_S$) or a sealing surface ($A_D$), and at least one second leg ($S_2$) reinforces the first leg ($S_1$).

2. The gas valve as claimed in claim 1, characterized in that a cross-sectional area of a web (3) of the valve seat situated radially on an outside is greater than that of a web (3) situated radially on an inside.

3. The gas valve as claimed in claim 1, characterized in that at least one web (3) of the valve seat (1) having through-flow openings (2) on both radial sides thereof has a substantially L-shaped cross section.

4. The gas valve as claimed in claim 3, characterized in that the second leg ($S_2$) encloses a right angle with the first leg ($S_1$).

5. The gas valve as claimed in claim 4, characterized in that the second leg ($S_2$) is arranged radially on the outside with respect to the radial extent of the first leg ($S_1$), on the side facing away from the seat surface ($A_S$) or the sealing surface ($A_D$).

6. The gas valve as claimed in claim 1, characterized in that the second leg ($S_2$) is arranged radially on an outside with respect to a radial extent of the first leg ($S_1$), on a side facing away from the seat surface ($A_S$) or the sealing surface ($A_D$).

7. The gas valve as claimed in claim 1, characterized in that the webs (3) of the valve seat (1) are connected by a plurality of radially extending webs (4).

8. The gas valve as claimed in claim 1, characterized in that the sealing webs (6) of the valve disk (5) are connected by at least one radially extending web (7).

9. The gas valve as claimed in claim 1, wherein the stiffness of the valve seat (1) is substantially constant in a radial direction.

10. The gas valve as claimed in claim 1, wherein the stiffness of the valve disk (5) is substantially constant in a radial direction.

11. The gas valve as claimed in claim 1, characterized in that the cross-sectional area of a sealing web (6) of the valve disk situated radially on the outside is greater than that of a sealing web (6) situated radially on the inside.

12. The gas valve as claimed in claim 1, characterized in that at least one sealing web (6) of the valve disk (5) having openings on both radial sides thereof has a substantially L-shaped cross section.

13. The gas valve as claimed in claim 12, characterized in that the second leg ($S_2$) encloses a right angle with the first leg ($S_1$).

14. The gas valve as claimed in claim 13, characterized in that the second leg ($S_2$) is arranged radially on the outside with respect to the radial extent of the first leg ($S_1$), on the side facing away from the seat surface ($A_S$) or the sealing surface ($A_D$).

15. The gas valve as claimed in claim 1, characterized in that the webs (3) of the valve seat (1) are connected by a plurality of radially extending webs (4), which are arranged at equal angular intervals.

16. The gas valve as claimed in claim 1, characterized in that the sealing webs (6) of the valve disk (5) are connected by at least one radially extending web (7), wherein a plurality of radially extending webs (7) is provided.

17. The gas valve as claimed in claim 1, characterized in that the sealing webs (6) of the valve disk (5) are connected by at least one radially extending web (7), wherein a plurality of radially extending webs (7) is provided, which are furthermore arranged at equal angular intervals.

18. An electromagnetically actuatable gas valve for metering a gaseous fuel into a suction tract of an engine, the gas valve comprising a valve seat (1), which is designed as a flat seat and which, to delimit circular or partially circular through-flow openings (2), has a plurality of concentrically arranged annular webs (3), which are connected by at least one radially extending web (4), further comprising a movable valve disk (5), which interacts sealingly with the valve seat (1) and which has a plurality of concentrically arranged annular sealing webs (6), which can be brought into overlap with the circular or partially circular through-flow openings (2) of the valve seat (1), wherein a stiffness of at least one of the valve seat (1) and the valve disk (5) is substantially constant in a radial direction, wherein the stiffness of the valve seat (1) is greater than the stiffness of the valve disk (5), wherein a web (3) of the valve seat (1) having through-flow openings (2) on both radial sides thereof has a substantially L-shaped cross section, and wherein a first leg ($S_1$) of the substantially L-shaped cross section forms a seat surface ($A_S$) or a sealing surface ($A_D$), and at least one second leg ($S_2$) reinforces the first leg ($S_1$).

19. The gas valve as claimed in claim 18, wherein a web (6) of the valve disk (5) having openings on both radial sides thereof has a substantially L-shaped cross section, and wherein a first leg ($S_1$) of the substantially L-shaped cross section of the web (6) of the valve disk forms a seat surface ($A_S$) or a sealing surface ($A_D$), and at least one second leg ($S_2$) of the substantially L-shaped cross section of the web (6) of the valve disk reinforces the first leg ($S_1$) of the substantially L-shaped cross section of the web (6) of the valve disk.

20. An electromagnetically actuatable gas valve for metering a gaseous fuel into a suction tract of an engine, the gas valve comprising a valve seat (1), which is designed as a flat seat and which, to delimit circular or partially circular through-flow openings (2), has a plurality of concentrically arranged annular webs (3), which are connected by at least one radially extending web (4), further comprising a movable valve disk (5), which interacts sealingly with the valve seat (1) and which has a plurality of concentrically arranged annular sealing webs (6), which can be brought into overlap with the circular or partially circular through-flow openings (2) of the valve seat (1), wherein a stiffness of at least one of the valve seat (1) and the valve disk (5) is substantially constant in a radial direction, wherein the stiffness of the valve seat (1) is greater than the stiffness of the valve disk (5), wherein a web (6) of the valve disk (5) having openings on both radial sides thereof has a substantially L-shaped cross section, and wherein a first leg ($S_1$) of the substantially L-shaped cross section forms a seat surface ($A_S$) or a sealing surface ($A_D$), and at least one second leg ($S_2$) reinforces the first leg ($S_1$).

* * * * *